United States Patent
Abe et al.

(10) Patent No.: US 6,975,503 B2
(45) Date of Patent: Dec. 13, 2005

(54) CHIP TYPE SOLID ELECTROLYTIC CAPACITOR HAVING PLATED FILLET SURFACE AND METHOD OF MANUFACTURING THE SAME

(75) Inventors: Satoshi Abe, Toyama (JP); Masami Ishijima, Toyama (JP)

(73) Assignee: NEC Tokin Corporation, Sendai (JP)

( * ) Notice: Subject to any disclaimer, the term of this patent is extended or adjusted under 35 U.S.C. 154(b) by 0 days.

(21) Appl. No.: 11/014,020

(22) Filed: Dec. 15, 2004

(65) Prior Publication Data

US 2005/0146842 A1    Jul. 7, 2005

(30) Foreign Application Priority Data

Jan. 7, 2004    (JP)    ............................ 2004-002180

(51) Int. Cl.⁷ .......................... H01G 4/228; H01G 9/00
(52) U.S. Cl. ...................... 361/533; 361/540; 29/25.03
(58) Field of Search ................................ 361/528–529, 361/532–533, 540; 29/25.03

(56) References Cited

U.S. PATENT DOCUMENTS 6,519,135 B2 *   2/2003   Sano et al. .................. 361/510
6,625,009 B2 *   9/2003   Maeda ........................ 361/528
6,808,541 B2 * 10/2004   Maeda ........................ 29/25.03
2003/0174462 A1 * 9/2003   Wada et al. ................ 361/533

FOREIGN PATENT DOCUMENTS

JP    9-298256 A    11/1997

* cited by examiner

Primary Examiner—Eric W. Thomas
(74) Attorney, Agent, or Firm—Frishauf, Holtz, Goodman & Chick, P.C.

(57) ABSTRACT

In a chip type solid electrolytic capacitor, an anode terminal is provided with an anode terminal lower surface exposed from a package lower surface and an anode terminal end surface adjacent to the anode terminal lower surface and exposed from a first package end surface. The cathode terminal is also provided with a cathode terminal lower surface and a cathode terminal end surface. The anode terminal end surface is provided with an anode terminal dent surface upwardly extending from the boundary with the anode terminal lower surface. The anode terminal dent surface is plated. The cathode terminal end surface is also provided with a cathode terminal dent surface which is plated.

10 Claims, 9 Drawing Sheets

CHIP TYPE SOLID ELECTROLYTIC CAPACITOR HAVING PLATED FILLET SURFACE AND METHOD OF MANUFACTURING THE SAME

This application claims priority to prior Japanese patent application JP 2004-2180, the disclosure of which is incorporated herein by reference.

BACKGROUND OF THE INVENTION

This invention relates to a chip type solid electrolytic capacitor, a method of manufacturing the capacitor, and a lead frame used for the method.

Solid electrolytic capacitor using tantalum or niobium as a valve function metal is small in size, large in capacity, and excellent in high frequency characteristic. Therefore, the solid electrolytic capacitor is widely used for a power supply circuit of a CPU (Central Processing Unit). In a small size electric equipment such as a portable electric equipment, a chip type solid electrolytic capacitor is often used. With the further downsizing of the small size electric equipment, the further downsizing and further thinning-down of the chip type solid electrolytic capacitor is also proceeding.

When the chip type solid electrolytic capacitor is surface-mounted on a printed circuit board (mounting object) with the use of solder, a fillet made of the solder is formed between the printed circuit board and an end surface (fillet surface) of a terminal of the chip type solid electrolytic capacitor. Because the fillet joins the chip type solid electrolytic capacitor to the printed circuit board, a condition how the fillet is formed is important. As a factor influencing on the forming condition of the fillet, there is solder wettability.

For example, when the solder does not sufficiently wet-up on or permeate onto the fillet surface, the solder is stopped and piled as far as a lower surface of the chip type solid electrolytic capacitor as a mounted surface contacted to the printed circuit board. In this state, the chip type solid electrolytic capacitor stands out or looses on the printed circuit board. Further, when the solder does not equally wet-up on the fillet surfaces of anode and cathode terminals, the chip type solid electrolytic capacitor tilts or leans to the printed circuit board.

In addition, there is an estimating method of the quality of soldering on the lower surface of the chip type solid electrolytic capacitor, by observing a condition of the solder in the fillet after soldering. When the solder does not sufficiently wet-up on the fillet surface, the estimating method is disturbed.

It is known that the fillet surface is plated in order to improve the solder wettability.

Regarding the plating for the fillet surface, a chip type electrolytic capacitor called as a lower surface terminal type as an example will be hereinafter described.

An art of the lower surface terminal type is suitable for downsizing and thinning-down of the chip type solid electrolytic capacitor. In the chip type solid electrolytic capacitor of the lower surface terminal type, a lower surface of a lead frame is exposed on the lower surface of the capacitor. Further, a cut surface, that is, an end surface of the lead frame is exposed on an end surface of the capacitor. The cut surface of the lead frame is used as the fillet surface.

Hereinafter, a common manufacturing process of the chip type solid electrolytic capacitor of the lower surface terminal type will be described.

First, a solid electrolytic capacitor element manufactured by a known process is mounted and bonded onto a lead frame. The bonded capacitor element and a part of the lead frame are molded and covered with a resin package. The packaged capacitor element and the packaged part of the lead frame are cut off from a main body of the lead frame. The part of the lead frame serves as a terminal of the chip type solid electrolytic capacitor. An end surface (cut surface) of the terminal exposed from an external surface of the package serves as the fillet surface. Further, the fillet surface of the terminal is plated. Thus, the chip type solid electrolytic capacitor of the lower surface terminal type has been manufactured.

In the above-mentioned plating step, a barrel plating is generally done as an afterplating. In the barrel plating, products (the packaged capacitor element and the packaged part of the lead frame) are dropped into a barrel with plating solution or liquid.

For example, such as a chip type solid electrolytic capacitor comprising a terminal with a plated fillet surface is disclosed in Japanese Patent Application Publication (JP-A) No. H9-298256.

However, in the case that the fillet surface of the terminal formed by cutting off the part of the lead frame from the main body of the lead frame is plated, there are disadvantages as follows.

Namely, the plating solution soaks into the package and therefore the performance of the chip type solid electrolytic capacitor may be deteriorated.

Furthermore, directions of the plated products become inconsistent with one another after the barrel plating. Therefore, it is necessary to draw up the products in upside and downside, in length and breadth, and in polar direction. This causes the increases in the number of manufacturing process, in the number of man-hour, and in the manufacturing cost of the chip type solid electrolytic capacitor. Moreover, because it is necessary to product and to use expensive equipment such as a product aligning apparatus, the manufacturing cost of the chip type solid electrolytic capacitor is further increased.

SUMMARY OF THE INVENTION

Therefore, it is a technical object of this invention to provide a chip type solid electrolytic capacitor having a plated fillet surface, excellent in productivity and reliability.

Therefore, it is another technical object of this invention to provide a method of manufacturing such as a capacitor.

Therefore, it is still another technical object of this invention to provide a lead frame used for such as a capacitor.

According to this invention, there is provided a chip type solid electrolytic capacitor a capacitor element, an anode terminal, a cathode terminal, and a resin package. The capacitor element is provided with an anode lead longitudinal, a solid dielectric layer, and a cathode layer. The solid dielectric layer is formed on the whole surface of the anode lead except an end region. The cathode layer is formed on the whole surface of the solid dielectric layer. The anode terminal is electrically connected to the end region an end region of the anode terminal. The cathode terminal is electrically connected to the cathode layer. The resin package covers the capacitor element and an each part of the anode and the cathode terminals. The resin package is further provided with a package lower surface to be contacted to a mounting object of the capacitor and first and second package end surfaces respectively adjacent to the package lower surface. The anode terminal is further provided with an anode terminal lower surface exposed from the package lower surface and an anode terminal end surface adjacent to the package lower surface and exposed from the first package end surface. The cathode terminal is further provided with a cathode terminal lower surface exposed from the package lower surface and a cathode terminal end surface adjacent to the package lower surface and exposed from the second package end surface. The anode terminal end surface is provided with an anode terminal dent surface upwardly extending from the boundary with the anode terminal lower surface. The anode terminal dent surface is plated. The cathode terminal end surface is provided with a cathode terminal dent surface upwardly extending from the boundary with the cathode terminal lower surface, the cathode terminal dent surface being plated.

According to this invention, there is also provided a method of manufacturing a chip type solid electrolytic capacitor. The capacitor comprises a solid capacitor element, a terminal electrically connected to an electrode of the solid capacitor element, and a resin package packaging the solid capacitor element and a part of the terminal. The method comprises the steps of preparing a lead frame. The lead frame comprises a plate portion provided with first and second plate surface and a cup portion formed on the plate portion. The cup portion is formed by denting the first plate surface in a thickness direction of the lead frame. An inside surface of the cup portion is plated. The method further comprises the steps of mounting the solid capacitor element on the second plate surface of the lead frame so that said electrode of the solid capacitor element is connected to the second plate surface, of packaging the solid capacitor element mounted on the second plate surface of the lead frame and an outside surface of the cup portion by the resin package, and of forming the terminal by cutting the lead frame with the solid capacitor element mounted thereon along a cutting surface parallel to the thickness direction of the lead frame and passing across the cup portion. A terminal dent surface is formed on a cut surface along the cutting surface of the terminal. The terminal dent surface is plated.

According to this invention, there is further provided a lead frame which serves as a terminal of a chip type solid electrolytic capacitor comprising a solid capacitor element, a terminal electrically connected to an electrode of the solid capacitor element, and a resin package packaging the solid capacitor element and a part of the terminal. The lead frame comprises first and second plate surface and a cup portion formed on the plate portion. The cup portion is formed by denting the first plate surface in a thickness direction of the lead frame. An inside surface of the cup portion is plated.

Still further structures and advantages of this invention will become clear as the description proceeds.

DESCRIPTION OF THE PREFERRED EMBODIMENTS

In order to facilitate an understanding of this invention, the existing art mentioned in the background of the specification will be described at first.

Figure 1C:
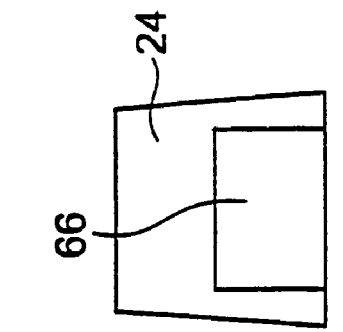
FIGS. 1A, 1B, and 1C are an elevational side view of an anode side, a cross sectional view, and another elevational side view of a cathode side showing the existing chip type solid electrolytic capacitor.
Figure 1B:
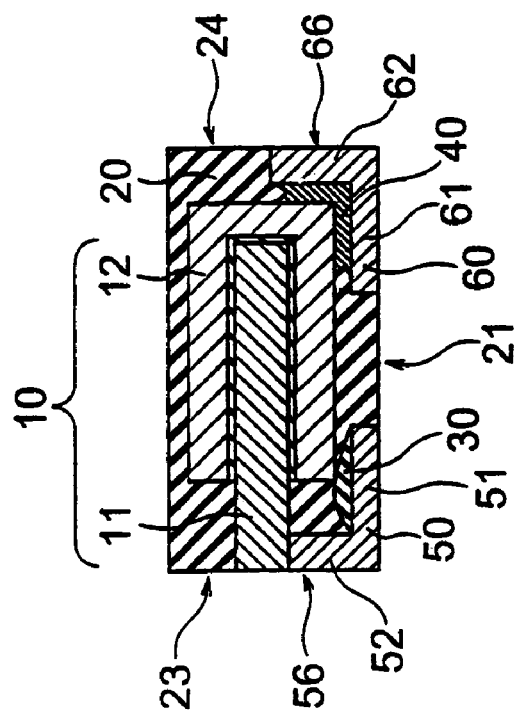
Figure 1A:
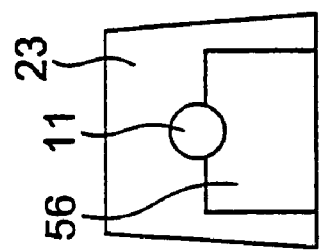

Referring to FIGS. 1A to 1C, the existing chip type solid electrolytic capacitor of the lower surface terminal type comprises a capacitor element 10, a resin package 20, an anode terminal 50, and a cathode terminal 60.

The capacitor element 10 has an anode lead 11 and a cathode layer 12 as electrodes of the element, respectively.

The resin package 20 covers the capacitor element 10 and is provided with a package lower surface 21 and first and second package end surfaces 23 and 24. When the capacitor is mounted on a printed circuit board (not shown), the package lower surface 21 contacts to a top surface of the printed circuit board through solder. The first and second package end surface 23 and 24 are respectively adjacent to the package lower surface 21 and are opposite to each other.

The anode terminal 50 is electrically connected to the anode lead 11. The cathode terminal 60 is electrically connected to the cathode layer 12 by an electrically-conductive adhesive 40. Although the cathode layer 12 is mechanically connected to the anode terminal 50, the cathode layer 12 and the anode terminal 50 are electrically insulated from each other by an electrical insulation resin 30.

The anode terminal 50 has a stepwise shape provided with an anode terminal first step portion 51 and an anode terminal second step portion 52. The anode terminal first step portion 51 is formed by cold- or hot-forging and is lower in height than the anode terminal second step portion 52. On the other hand, the cathode terminal 60 also has a stepwise shape provided with a cathode terminal first step portion 61 and a cathode terminal second step portion 62. The cathode terminal first step portion 61 is formed by cold- or hot-forging and is lower in height than the cathode terminal second step portion 62.

The anode terminal 50 is exposed from the package lower surface 21 (a mounted surface of the capacitor) and the first package end surface 23 of the resin package 20. On the other hand, the cathode terminal 60 is exposed from the package lower surface 21 and the second package end surface 24 of the resin package 20. These exposed surfaces are plated. An anode terminal end surface 56 exposed in the first package end surface 23 of the anode terminal 50 serves as the fillet surface. A cathode terminal end surface 66 exposed in the second package end surface 24 of the cathode terminal 60 also serves as the fillet surface.

Figure 2:
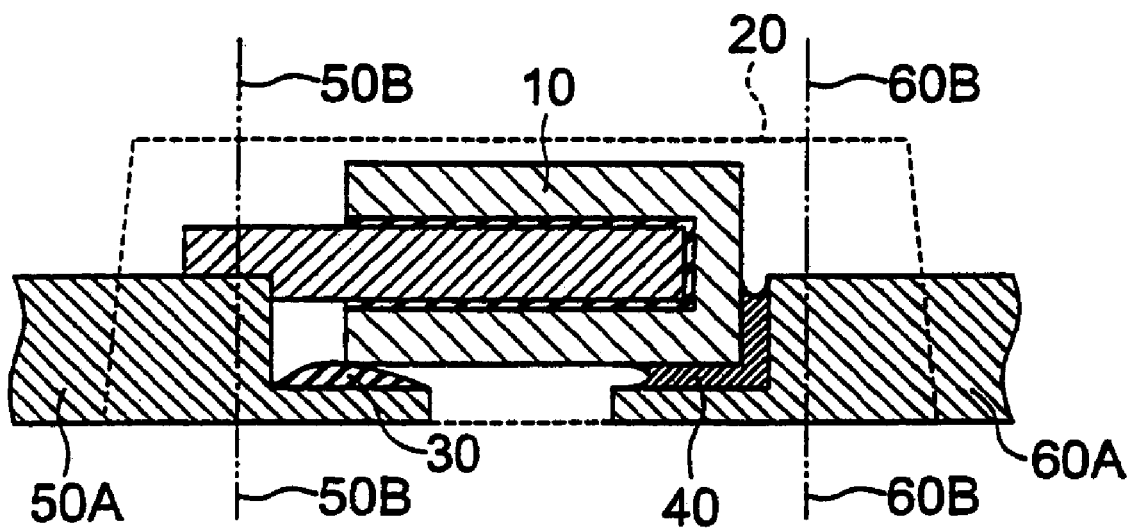
FIG. 2 is a sectional view showing the existing capacitor element mounted and bonded onto a lead frame and packaged by a resin package.
Figure 3:
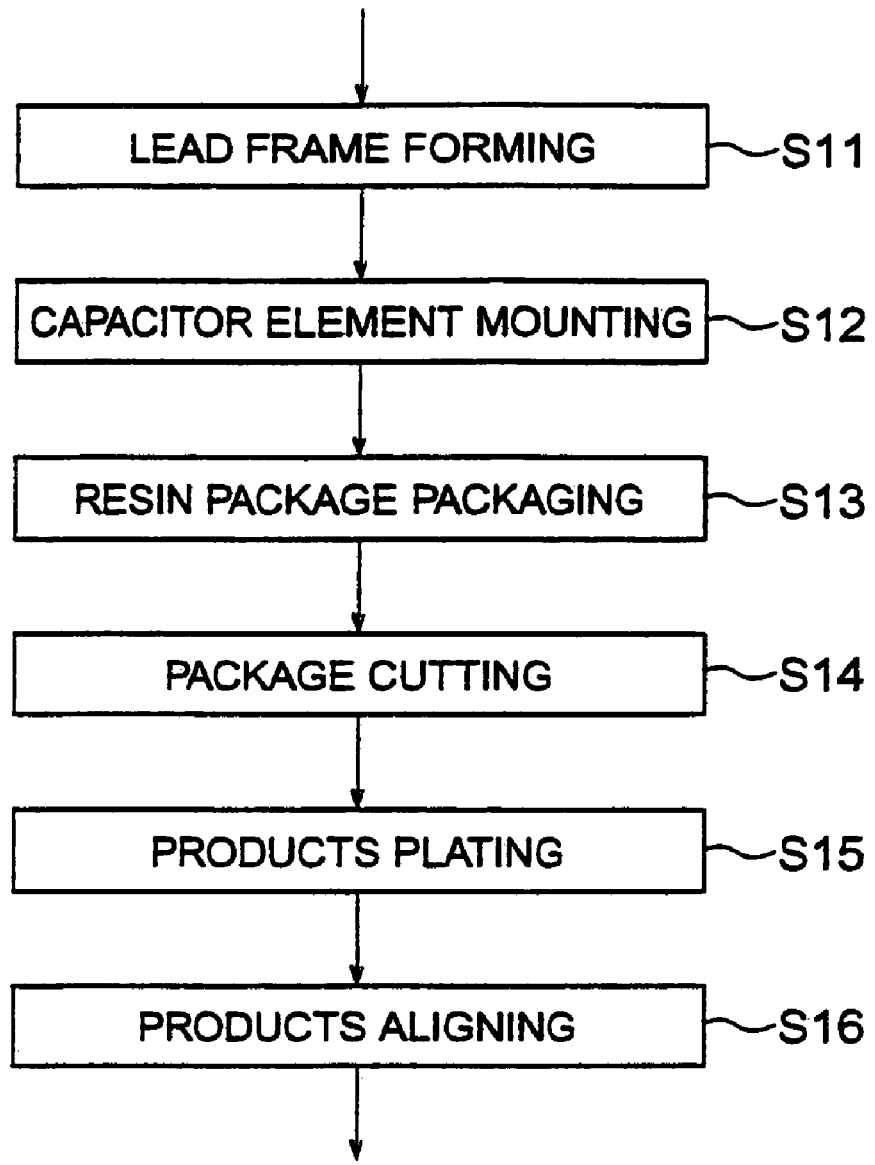
FIG. 3 is a flow chart for illustrating the existing method of manufacturing the existing chip type solid electrolytic capacitor.

Next, a method of manufacturing the chip type solid electrolytic capacitor shown in FIGS. 1A to 1C will be described with respect to FIGS. 2 and 3.

First, the capacitor element is manufactured by the known method.

On the other hand, the lead frame is formed and manufactured by pressing a sheet metal (step S11). In FIG. 2, reference numbers 50A and 60A indicate anode and cathode terminal-forming regions of the lead frame, respectively. The anode and the cathode terminal-forming regions 50A and 60A respectively have a stepwise shape, as shown in FIG. 2.

The capacitor element 10 is mounted and bonded onto the lead frame (step S12). In this step, the anode lead of the capacitor element 10 is electrically connected by welding or by the use of electrically-conductive adhesive to the higher step portion of the anode terminal-forming region 50A. The higher step portion of the anode terminal-forming region 50A becomes or serves as the anode terminal second step portion 52 (FIG. 1B). On the other hand, the cathode layer of the capacitor element 10 is electrically connected to the lower and the higher step portions of the cathode terminal-forming region 60A by the use of an electrically-conductive adhesive 40. The lower and higher step portions of the cathode terminal-forming region 60A respectively become or serve as the cathode terminal first and second step portions 61 and 62 (FIG. 1B) by the use of the electrically-conductive adhesive 40. In addition, the cathode layer of the capacitor element 10 is mechanically connected to but electrically insulated from the lower step portion of the anode terminal-forming region by the electrical insulation resin 30. The lower step portion of the anode terminal-forming region 50A becomes or serves as the anode terminal first step portion 71 (FIG. 1B).

The capacitor element 10 mounted on the lead fame is packaged by the resin package 20 (step S13).

The capacitor element 10 packaged by the resin package 20 is cut off from a base region of the lead frame along cutting surfaces 50B and 60B (step S14). The cutting surfaces 50B and 60B become the first and the second package end surfaces of the capacitor.

Furthermore, exposed surfaces of the anode and the cathode terminal-forming regions 50A and 60A exposed from the resin package 20 are plated (step S15) . For example, this step is carried out by barrel plating in which a plurality of the capacitors (each of which includes the packaged capacitor element and the packaged part of the lead frame) are dropped into the barrel with plating solution.

Capacitors which are directed in inconsistent directions in the barrel plating are drawn up in upside and downside, in length and breadth, and in polar direction, with the use of the product aligning apparatus (step S16).

Thus, the chip type solid electrolytic capacitor shown in FIGS. 1A to 1C has been manufactured.

The chip type solid electrolytic capacitor mentioned above has the advantages and the disadvantages described in the background of the invention in this specification.

Next, preferred embodiments of this invention will be described with reference to the drawing.

Figure 4C:
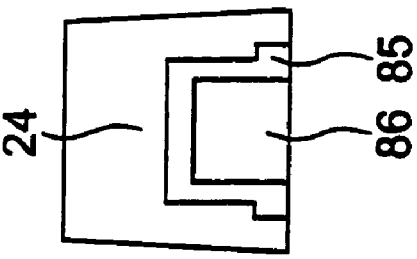
FIGS. 4A, 4B, and 4C are an elevational side view of an anode side, a cross sectional view, and another elevational side view of a cathode side showing a chip type solid electrolytic capacitor according to embodiments of this invention.
Figure 4B:
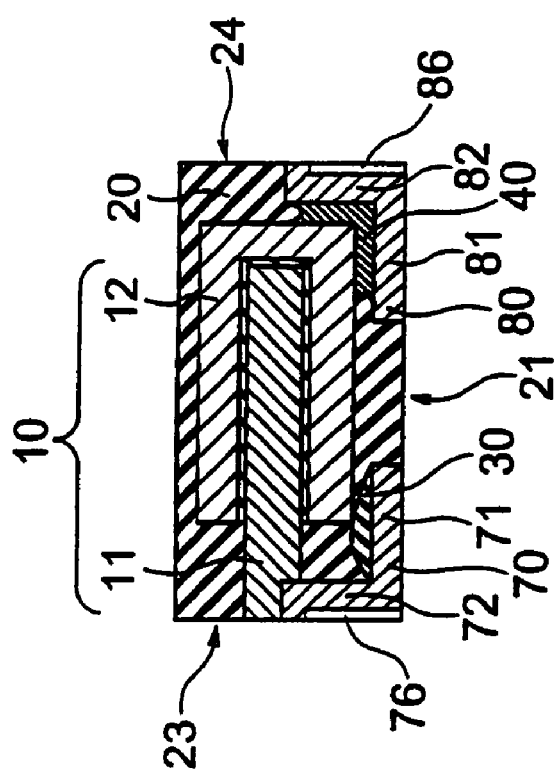
Figure 4A:
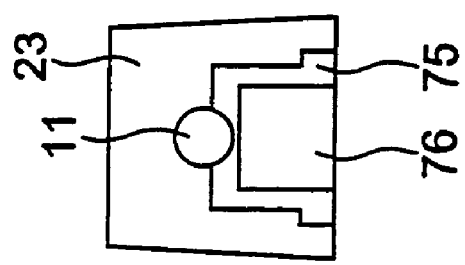
Figure 5:
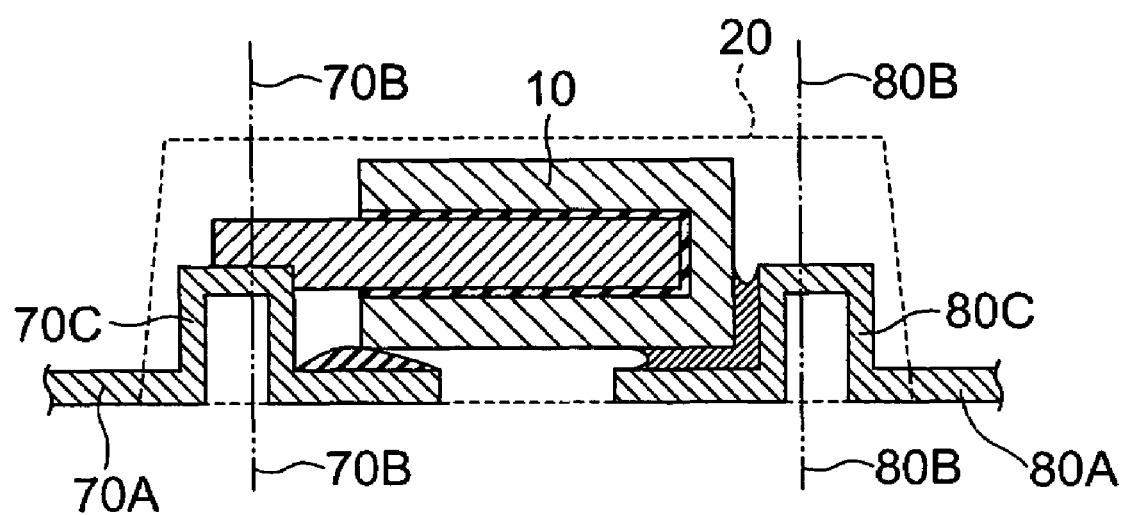
FIG. 5 is a sectional view showing a capacitor element according to the embodiment of this invention mounted and bonded onto a lead frame and packaged by a resin package.
Figure 6:
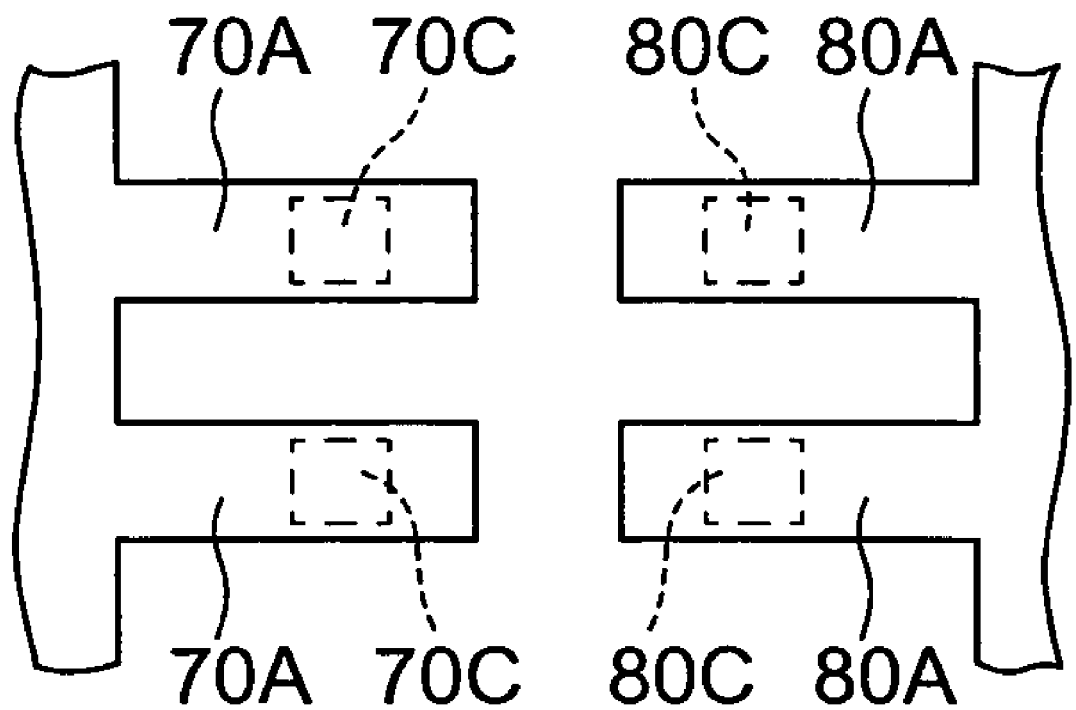
FIG. 6 is a top plan view showing a main part of a lead frame according to the embodiment of this invention.
Figure 7A:
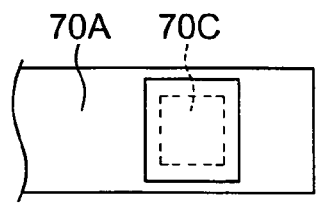
FIGS. 7A, 7B, 7C, and 7D are a plan, an elevational side, another elevational side, and a cross sectional views showing a cup portion of the lead frame according to the embodiment of this invention.
Figure 7B:
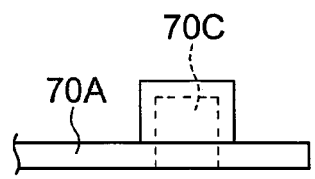
Figure 7C:
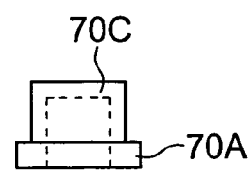
Figure 7D:
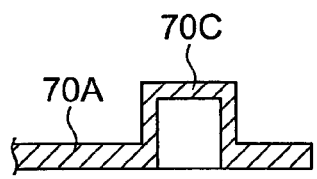

Referring to FIGS. 4A to 4C, a chip type solid electrolytic capacitor of the lower surface terminal type according to an embodiment of this invention comprises a capacitor element 10, a resin package 20, an anode terminal 70, and a cathode terminal 80.

The capacitor element 10 has an anode lead 11 and a cathode layer 12 as electrodes of the element, respectively.

The resin package 20 covers the capacitor element 10 and is provided with a package lower surface 21 and first and second package end surfaces 23 and 24. When the capacitor is mounted on a printed circuit board (not shown), the package lower surface 21 contacts to a top surface of the printed circuit board through solder. The first and second package end surface 23 and 24 are respectively adjacent to the package lower surface 21 and are opposite to each other.

The anode terminal 70 is electrically connected to the anode lead 11. The cathode terminal 80 is electrically connected to the cathode layer 12 by an electrically-conductive adhesive 40. The cathode layer 12 and the anode terminal 70 are electrically insulated from each other by an electrical insulation resin 30.

The anode terminal 70 has a stepwise shape provided with an anode terminal first step portion 71 and an anode terminal second step portion 72. The anode terminal first step portion 71 is formed by cold- or hot-forging and is lower in height than the anode terminal second step portion 72. On the other hand, the cathode terminal 80 also has a stepwise shape provided with a cathode terminal first step portion 81 and a cathode terminal second step portion 82. The cathode terminal first step portion 81 is formed by cold- or hot-forging and is lower in height than the cathode terminal second step portion 82.

The anode terminal 70 is provided with an anode terminal lower surface exposed from the package lower surface 21 (a mounted surface of the capacitor) and an anode terminal end surface 75 adjacent to the anode terminal lower surface and exposed from the first package end surface 23. On the other hand, the cathode terminal 80 is provided with a cathode terminal lower surface exposed from the package lower surface 21 and a cathode terminal end surface 85 adjacent to the cathode terminal lower surface and exposed from the second package end surface 24.

The anode terminal end surface 75 is provided with an anode terminal dent surface 76 upwardly extending from a boundary with the anode terminal lower surface. The anode terminal dent surface 76 serves as a fillet surface. On the other hand, the cathode terminal end surface 85 is also provided with a cathode terminal dent surface 86 upwardly extending from a boundary with the cathode terminal lower surface. The cathode terminal dent surface 86 also serves as a fillet surface.

The anode terminal lower surface and the anode terminal dent surface 76 and the cathode terminal lower surface and the cathode terminal dent surface 86 are plated.

Now, a method of manufacturing the chip type solid electrolytic capacitor shown in FIGS. 4A to 4C will be described.

First, the capacitor element is manufactured by the known manufacturing process. For example, tantalum is used as a valve function metal. Tantalum powder is molded by a press machine on a peripheral surface of a tantalum wire to be or serving as the anode lead 11 (FIGS. 4A to 4C). The tantalum wire is sintered under high vacuum and at high temperature. Next, an oxidized film of $Ta_2O_5$ is formed on the tantalum powder on the sintered body. Further, the sintered body is thermally decomposed after it is soaked in a solution of manganese nitrate and thus an $MnO_2$ layer is formed on it. Next, graphite layer and Ag (silver) layer are formed on the sintered body. The cathode layer 12 (FIGS. 4A to 4C) consists of the $MnO_2$ layer, the graphite layer, and the silver layer. Thus, the capacitor element 10 is manufactured.

Instead of the $MnO_2$ layer of the cathode layer 12, conducting polymer such as polythiophene or polypyrrole can be used. This composition is advantageous to reduce ESR (Equivalent Series Resistance) of the chip type solid electrolytic capacitor. Furthermore, as the valve function metal used for the anode lead other than the tantalum, the material such as niobium, aluminum, and titanium can be used.

On the other hand, referring to FIGS. 5, 6, 7A to 7D, and 9, the lead frame is formed by pressing a sheet metal (step S21). In FIGS. 5, 6, and 7A to 7D, reference numbers 70A and 80A indicate anode and cathode terminal-forming regions of the lead frame, respectively. Manufactured lead frame has the stepwise shape, as shown in FIGS. 5 and 7A to 7D. Further, the lead frame is provided with cup portions 70C and 80C formed by pressing, extrusion drawing, and so on, as shown in FIGS. 5, 6, and 7A to 7D.

Next, the full-surface or at least inside surfaces of the cup portions 70C and 80C of the formed lead frame are plated (step S22). For example, this step is carried out by the barrel plating that the lead frame is dropped into the barrel with plating solution. A plating film includes at least one of Ag, Au (gold), Cu (copper), Pd (palladium), and Sn (tin).

The capacitor element 10 is mounted and bonded onto the plated lead frame (step S23). In this step, the anode lead of the capacitor element 10 is electrically connected by an electrically-conductive adhesive 40 to the higher step portion of the anode terminal-forming region 70. The higher step portion of the anode terminal-forming region 70A becomes or serves as the anode terminal second step portion 72 (FIG. 4B). On the other hand, the cathode layer of the capacitor element 10 is electrically connected to the lower and the higher step portions of the cathode terminal-forming region 80A. The lower and higher step portions of the cathode terminal-forming region 80A respectively become or serve as the cathode terminal first and second step portions 81 and 82 (FIG. 4B). In addition, the cathode layer of the capacitor element 10 is mechanically connected to but electrically insulated from the lower step portion of the anode terminal-forming region 70A by the electrical insulation resin 30. The lower step portion of the anode terminal-forming region 70A becomes or serves as the anode terminal first step portion 71 (FIG. 4B).

The capacitor element 10 mounted on the lead fame is packaged by the resin package 20 in the manner such as a transfer molding process (step S24). The plated layer still remains on the inside surfaces of the cup portions 70C and 80C after this step.

The capacitor element 10 packaged by the resin package 20 is cut off from a base region of the lead frame along cutting surfaces 70B and 80B (step S25). The cutting surfaces 70B and 80B become the first and the second end surfaces of the capacitor.

Thus, the chip type solid electrolytic capacitor shown in FIGS. 4A to 4C has been manufactured.

In the manufactured capacitor, the plated layer still remains on the anode and the cathode terminal dent surfaces 76 and 86. The anode and the cathode terminal dent surfaces 76 and 86 are used as the fillet surfaces.

The cup portion of the lead frame of this invention may have various shapes according to first to sixth embodiments of this invention, which will be described with respect to FIGS. 8A to 8F. Although only the anode terminal-forming region 70A is shown in FIGS. 8A to 8F and described below while the cathode terminal-forming region is omitted, the cathode terminal-forming region is formed in a manner similar to the anode terminal-forming region 70A.

First Embodiment

Figure 8A:
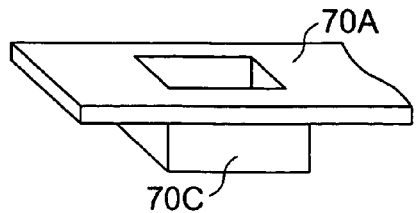
FIGS. 8A to 8F are perspective views showing various cup portions as first to sixth embodiments of this invention, respectively.

Referring to FIG. 8A, the lead frame according to the first embodiment of this invention is provided with a cup portion 70C formed on the anode terminal-forming region 70A. The cup portion 70C has a square-column shape or a partial square-pyramid shape.

Figure 9:
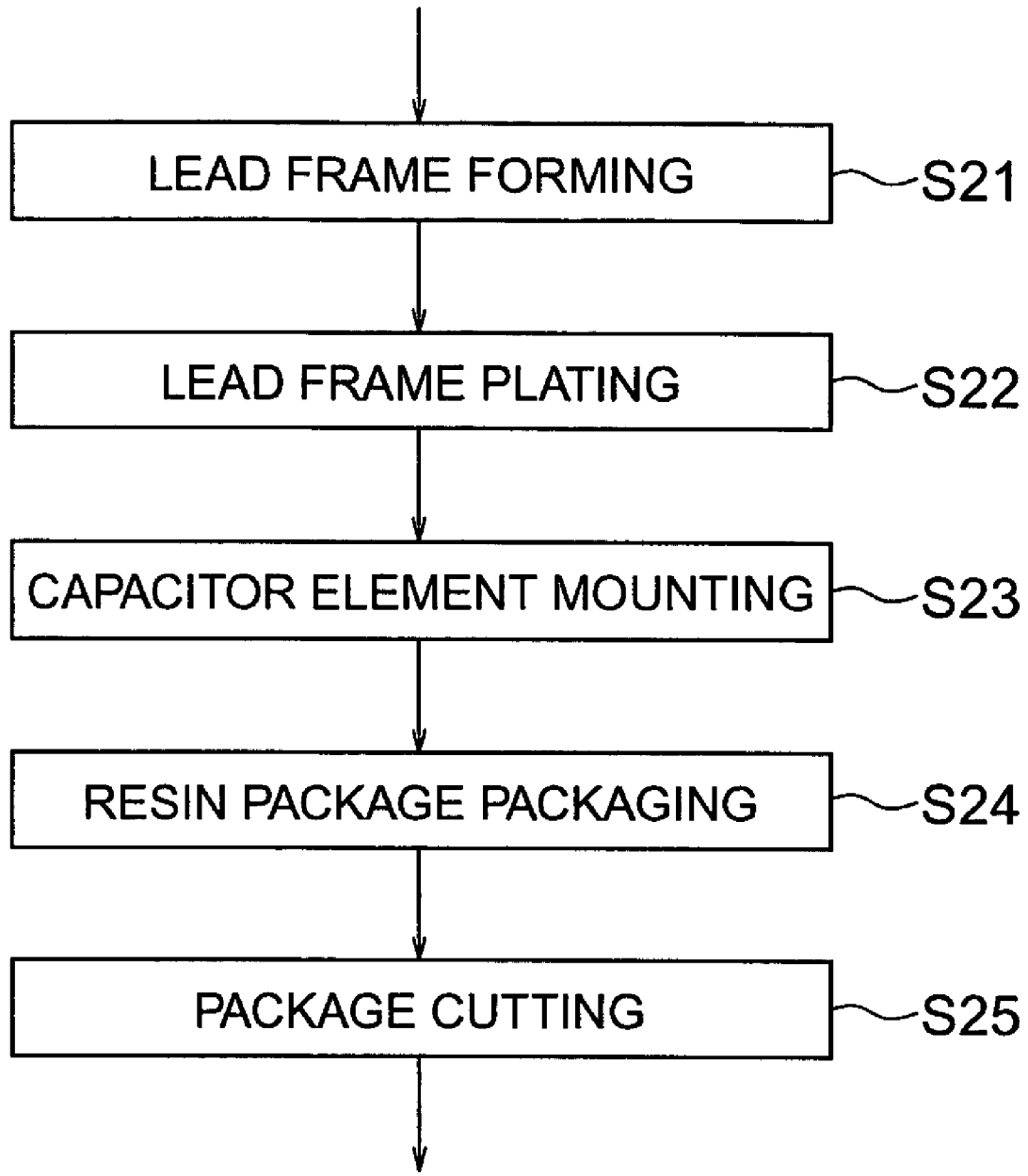
FIG. 9 is a flow chart for illustrating the existing method of manufacturing the existing chip type solid electrolytic capacitor according to the embodiment of this invention.

The cup portion 70C is formed by pressing, extrusion drawing, and so on when the lead frame is formed by the pressing of sheet metal (step S21 in FIG. 9). At least inside surface of the cup portions 70C of the formed lead frame is plated (step S22 in FIG. 9). The capacitor element is mounted and bonded onto the plated lead frame (step S23 in FIG. 9). The capacitor element mounted on the lead fame is packaged by the resin package (step S24 in FIG. 9). Further, the capacitor element packaged by the resin package is cut off from a base region of the lead frame along a cutting surface passing across the cup portion 70C (step S25 in FIG. 9).

The cutting surface becomes or serves as the first package end surface of the chip type solid electrolytic capacitor. On the first package end surface, an anode terminal end surface of an anode terminal is exposed. On the anode terminal end surface, an anode terminal dent surface having a semi square-column shape or a semi partial square-pyramid shape is formed. In the manufactured capacitor, the plated layer still remains on the anode terminal dent surface. The anode terminal dent surface is used as the fillet surface.

Second Embodiment

Figure 8B:
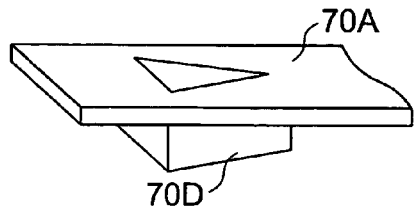

Referring to FIG. 8B, the lead frame according to the second embodiment of this invention is provided with a cup portion 70D formed on the anode terminal-forming region 70A. The cup portion 70D has a trigonal-column shape or a partial trigonal-pyramid shape.

The cup portion 70D is formed by pressing, extrusion drawing, and so on when the lead frame is formed by the pressing of sheet metal (step S21 in FIG. 9). At least inside surface of the cup portions 70D of the formed lead frame is plated (step S22 in FIG. 9). The capacitor element is mounted and bonded onto the plated lead frame (step S23 in FIG. 9). The capacitor element mounted on the lead fame is packaged by the resin package (step S24 in FIG. 9). Further, the capacitor element packaged by the resin package is cut off from a base region of the lead frame along a cutting surface passing across the cup portion 70D (step S25 in FIG. 9).

The cutting surface becomes or serves as the first package end surface of the chip type solid electrolytic capacitor. On the first package end surface, an anode terminal end surface of an anode terminal is exposed. On the anode terminal end surface, an anode terminal dent surface having a semi trigonal-column shape or a semi partial trigonal-pyramid shape is formed. In the manufactured capacitor, the plated layer still remains on the anode terminal dent surface. The anode terminal dent surface is used as the fillet surface.

Third Embodiment

Figure 8C:
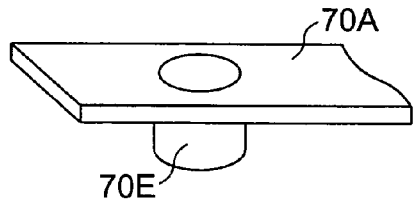

Referring to FIG. 8C, the lead frame according to the third embodiment of this invention is provided with a cup portion 70E formed on the anode terminal-forming region 70A. The cup portion 70E has a circular-column shape or a partial cone shape.

The cup portion 70E is formed by pressing, extrusion drawing, and so on when the lead frame is formed by the pressing of sheet metal (step S21 in FIG. 9). At least inside surface of the cup portions 70E of the formed lead frame is plated (step S22 in FIG. 9). The capacitor element is mounted and bonded onto the plated lead frame (step S23 in FIG. 9). The capacitor element mounted on the lead fame is packaged by the resin package (step S24 in FIG. 9). Further, the capacitor element packaged by the resin package is cut off from a base region of the lead frame along a cutting surface passing across the cup portion 70E (step S25 in FIG. 9).

The cutting surface becomes or serves as the first package end surface of the chip type solid electrolytic capacitor. On the first package end surface, an anode terminal end surface of an anode terminal is exposed. On the anode terminal end surface, an anode terminal dent surface having a semi circular-column shape or a semi partial cone shape is formed. In the manufactured capacitor, the plated layer still remains on the anode terminal dent surface. The anode terminal dent surface is used as the fillet surface.

Fourth Embodiment

Figure 8D:
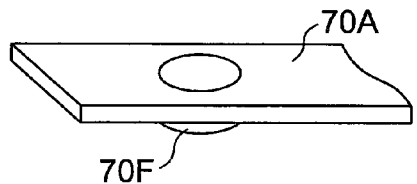

Referring to FIG. 8D, the lead frame according to the fourth embodiment of this invention is provided with a cup portion 70F formed on the anode terminal-forming region 70A. The cup portion 70F has a semisphere shape.

The cup portion 70F is formed by pressing, extrusion drawing, and so on when the lead frame is formed by the pressing of sheet metal (step S21 in FIG. 9). At least inside surface of the cup portions 70F of the formed lead frame is plated (step S22 in FIG. 9). The capacitor element is mounted and bonded onto the plated lead frame (step S23 in FIG. 9). The capacitor element mounted on the lead fame is packaged by the resin package (step S24 in FIG. 9). Further, the capacitor element packaged by the resin package is cut off from a base region of the lead frame along a cutting surface passing across the cup portion 70F (step S25 in FIG. 9).

The cutting surface becomes or serves as the first package end surface of the chip type solid electrolytic capacitor. On the first package end surface, an anode terminal end surface of an anode terminal is exposed. On the anode terminal end surface, an anode terminal dent surface having a quarter-sphere or a partial sphere is formed. In the manufactured capacitor, the plated layer still remains on the anode terminal dent surface. The anode terminal dent surface is used as the fillet surface.

Fifth Embodiment

Figure 8E:
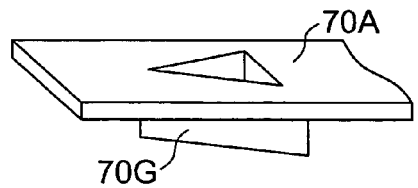

Referring to FIG. 8E, the lead frame according to the fifth embodiment of this invention is provided with a cup portion 70G formed on the anode terminal-forming region 70A. The cup portion 70G has a trigonal-column shape or a partial trigonal-pyramid shape formed like the second embodiment. However, the cup portion 70G has an arrangement or an aspect different in direction from the second embodiment.

The cup portion 70G is formed by pressing, extrusion drawing, and so on when the lead frame is formed by the pressing of sheet metal (step S21 in FIG. 9). At least inside surface of the cup portions 70G of the formed lead frame is plated (step S22 in FIG. 9). The capacitor element is mounted and bonded onto the plated lead frame (step S23 in FIG. 9). The capacitor element mounted on the lead fame is packaged by the resin package (step S24 in FIG. 9). Further, the capacitor element packaged by the resin package is cut off from a base region of the lead frame along a cutting surface passing across the cup portion 70G (step S25 in FIG. 9).

The cutting surface becomes or serves as the first package end surface of the chip type solid electrolytic capacitor. On the first package end surface, an anode terminal end surface of an anode terminal is exposed. On the anode terminal end surface, an anode terminal dent surface having a semi trigonal-column shape or a semi partial trigonal-pyramid shape is formed. In the manufactured capacitor, the plated layer still remains on the anode terminal dent surface. The anode terminal dent surface is used as the fillet surface.

Sixth Embodiment

Figure 8F:
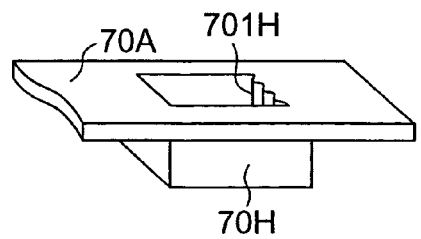

Referring to FIG. 8F, the lead frame according to the sixth embodiment of this invention is provided with a cup portion 70H formed on the anode terminal-forming region 70A. The cup portion 70H has a square-column shape or a partial square-pyramid shape. Particularly, the cup portion 70H is provided with a spline or stria portion 701H vertically formed on an inside peripheral surface of the cup portion 70H.

The cup portion 70H is formed by pressing, extrusion drawing, and so on when the lead frame is formed by the pressing of sheet metal (step S21 in FIG. 9). At least inside surface of the cup portions 70H of the formed lead frame is plated (step S22 in FIG. 9). The capacitor element is mounted and bonded onto the plated lead frame (step S23 in FIG. 9). The capacitor element mounted on the lead fame is packaged by the resin package (step S24 in FIG. 9). Further, the capacitor element packaged by the resin package is cut off from a base region of the lead frame along a cutting surface passing across the cup portion 70H (step S25 in FIG. 9).

The cutting surface becomes or serves as the first package end surface of the chip type solid electrolytic capacitor. On the first package end surface, an anode terminal end surface of an anode terminal is exposed. On the anode terminal end surface, an anode terminal dent surface having a semi square-column shape or a semi partial square-pyramid shape provided with the spline portion 701H is formed. In the manufactured capacitor, the plated layer still remains on the anode terminal dent surface. The anode terminal dent surface is used as the fillet surface.

In the sixth embodiment, because the solder easily wets-up on or permeates onto the fillet surface along the spline portion 701H by capillary phenomenon, more excellent wettability of solder is anticipated.

In this invention, the shape of the cup portion formed on the lead frame is not restricted to each that of the first to the sixth embodiments. For example, the shape of the cup portion can be a trapezoidal-column shape, a partial trapezoidal-pyramid, or a solid shape provided with at least one of a plane surface and a curved surface.

According to this invention, the afterplating is unnecessary and therefore the adverse effect to the product by the plating solution is avoided. Furthermore, it is unnecessary to draw up the products in direction after plating.

So far, this invention has been described in conjunction with several embodiments. However, this invention is not restricted to the embodiments mentioned above but may be modified in various manners by those skilled in the art within the scope of this invention.

What is claimed is:

1. A chip type solid electrolytic capacitor comprising:
    a capacitor element including an anode lead, a solid dielectric layer, and a cathode layer;
    an anode terminal which is electrically connected to an end region of said anode lead;
    a cathode terminal which is electrically connected to said cathode layer; and
    a resin package covering said capacitor element and a part of each of said anode terminal and said cathode terminal, said resin package including a package lower surface to be contacted to a mounting object and first and second package end surfaces adjacent to said package lower surface;

wherein said anode terminal comprises: (i) an anode terminal lower surface exposed from said package lower surface, (ii) an anode terminal end surface adjacent to said anode terminal lower surface and exposed from said first package end surface, and (iii) an anode terminal dent surface in said anode terminal end surface, wherein said anode terminal dent surface extends upwardly from a boundary with said anode terminal lower surface and is plated; and wherein said cathode terminal comprises: (i) a cathode terminal lower surface exposed from said package lower surface, (ii) a cathode terminal end surface adjacent to said cathode terminal lower surface and exposed from said second package end surface, and (iii) a cathode terminal dent surface in said cathode terminal end surface, wherein said cathode terminal dent surface extends upwardly from a boundary with said cathode terminal lower surface and is plated.

2. The chip type solid electrolytic capacitor according to claim 1, wherein said anode terminal has a stepwise shape comprising: an anode terminal first step portion including a part of said anode terminal lower surface, and an anode terminal second step portion including said anode terminal end surface and a remaining part of said anode terminal lower surface, said anode terminal second step portion being higher in height than said anode terminal first step portion;

wherein said anode lead is electrically connected to an upper surface of said anode terminal second step portion;

wherein said cathode terminal having a stepwise shape comprising: a cathode terminal first step portion including a part of said cathode terminal lower surface, and a cathode terminal second step portion including said cathode terminal end surface and a remaining part of said cathode terminal lower surface, said cathode terminal second step portion being higher in height than said cathode terminal first step portion; and wherein said cathode layer is electrically connected to an upper surface of said cathode terminal first step portion and a side surface of said cathode terminal second step portion.

3. The chip type solid electrolytic capacitor according to claim 1, wherein said anode and said cathode terminal dent surfaces are plated by a plating layer including at least one of Ag, Au, Cu, Pd, and Sn.

4. The chip type solid electrolytic capacitor according to claim 1, wherein said cathode layer is connected to said cathode terminal by electrically conductive adhesive.

5. A lead frame for forming a terminal of a chip type solid electrolytic capacitor comprising (i) a solid capacitor element including an electrode electrically connected to the terminal, and (ii) a resin package packaging said solid capacitor element and a part of said terminal; said lead frame comprising:

a first plate surface and a second plate surface; and
a cup portion which is formed by denting said first plate surface in a thickness direction of said lead frame;
wherein an inside surface of said cup portion is plated.

6. The lead frame according to claim 5, wherein said cup portion has one of a column shape, a partial cone shape, and a pyramid shape.

7. The lead frame according to claim 5, wherein a spline portion is formed on said inside surface of said cup portion such that said spline portion extends in said thickness direction of said lead frame.

8. The lead frame according to claim 5, wherein said inside surface of said cup portion is plated by a plating layer including at least one of Ag, Au, Cu, Pd, and Sn.

9. A method of manufacturing a chip type solid electrolytic capacitor comprising a solid capacitor element, a terminal electrically connected to an electrode of said solid capacitor element, and a resin package packaging said solid capacitor element and a part of said terminal, said method comprising:

preparing a lead frame comprising: (i) a plate portion including a first plate surface and a second plate surface, and (ii) a cup portion which is formed by denting said first plate surface in a thickness direction of said lead frame, wherein an inside surface of said cup portion is plated;

mounting said solid capacitor element on said second plate surface of said lead frame so that said electrode of said solid capacitor element is connected to said second plate surface;

packaging said solid capacitor element mounted on said second plate surface of said lead frame and an outside surface of said cup portion with resin to form said resin package; and forming said terminal by cutting said lead frame with said solid capacitor element mounted thereon along a cutting surface which is parallel to said thickness direction of said lead frame and which crosses said cup portion;

wherein a cut surface along said cutting surface of said terminal forms a said terminal dent surface which is plated.

10. The method according to claim 9, wherein said inside surface of said cup portion is plated by a plating layer including at least one of Ag, Au, Cu, Pd, and Sn.

* * * * *